Figure 1:
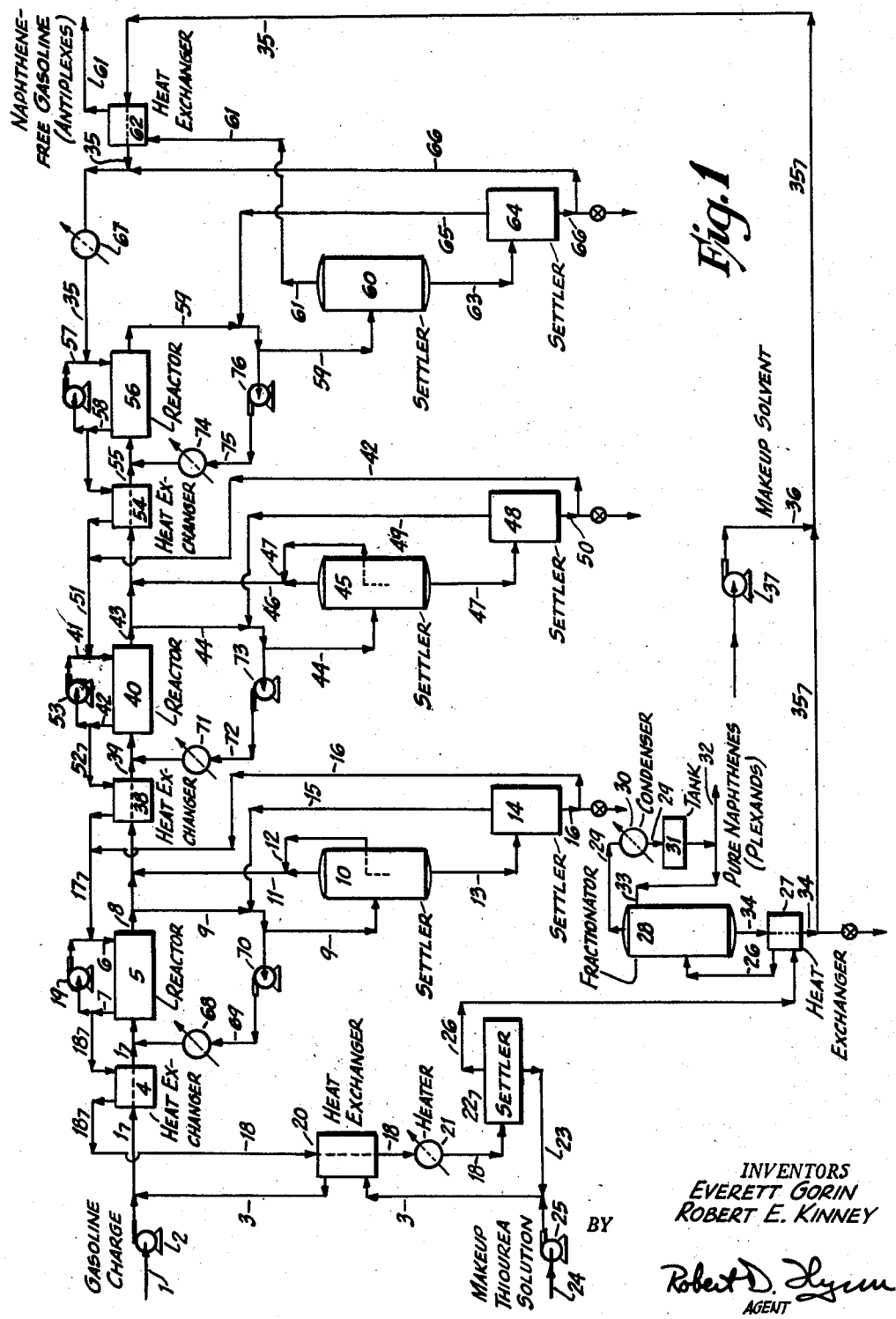

June 16, 1953 E. GORIN ET AL 2,642,424
METHOD OF SEPARATING HYDROCARBONS WITH THIOUREA
Filed Nov. 12, 1952 2 Sheets-Sheet 1

INVENTORS
EVERETT GORIN
ROBERT E. KINNEY
BY
Robert D. Lynn
AGENT

Patented June 16, 1953

2,642,424

UNITED STATES PATENT OFFICE 2,642,424

METHOD OF SEPARATING HYDROCARBONS WITH THIOUREA

Everett Gorin, Pittsburgh, Pa., and Robert E. Kinney, Woodbury, N. J., assignors to Socony-Vacuum Oil Company, Incorporated, a corporation of New York Application November 12, 1952, Serial No. 320,012

19 Claims. (Cl. 260—96.5)

This invention has to do with the separation of hydrocarbons of different molecular configuration from mixtures containing the same, and also has to do with the preparation of new and novel compositions. More particularly, the invention is concerned with the separation of isomeric branched chain aliphatic hydrocarbons from related straight chain or less highly branched aliphatic hydrocarbons, and is also concerned with the separation of cycloparaffins and cycloolefins from hydrocarbon fractions.

This application is a continuation-in-part of applications Serial Nos. 115,512, filed September 13, 1949, and 115,730, filed September 14, 1949, which applications have been abandoned in favor of this application.

I. FIELD OF INVENTION

Hydrocarbon mixtures of a diverse nature are formed in various petroleum processes. In order to utilize to the best advantage certain components of such mixtures, it is desirable to isolate and recover the various components in a pure or substantially concentrated form. With some hydrocarbon mixtures, however, conventional separation procedures are of little value or are impractical from a commercial standpoint. For example, fractional distillation methods are not advantageous with a mixture of paraffins and cycloparaffins of approximately the same boiling point. Azeotropic distillation procedures have been useful in resolving only some of these mixtures. The same obtains for ordinary selective solvents.

Recent process of hydrocarbon conversion such as alkylation, isomerization, and the like, provide hydrocarbon mixtures which are almost entirely paraffinic, but contain both straight-chain and branched-chain isomeric compounds. Some crudes, by straight distillation operations, give rise to similar mixtures. Generally, some separation can be effected by carefully conducted close fractional distillation, but such distillation is usually productive of mixtures containing two or more paraffin hydrocarbons boiling so close together that it is impractical to separate them further by fractionation alone. The components of such mixtures some time differ in the degree of branching and therefore in anti-knock value, so that it is highly desirable to affect a more efficient separation.

For example, in the preparation of triptane (2,2,3-trimethyl butane) which is an extremely valuable anti-knock ingredient, the hydrocarbon product invariably includes other heptanes. There can be separated, by closely controlled fractionation, a cut or fraction containing: triptane, boiling at 80.88° C., 2,2-dimethyl pentane, boiling at 79.22° C., and 2,4-dimethyl pentane, boiling at 80.6° C. Obviously, further separation by fractionation is quite difficult and economically impractical; yet triptane is so much the best anti-knock agent of the three heptanes that its separation or at least concentration is of considerable importance.

Ordinary selective solvent refining agents are quite incapable of application to this problem. For example, aniline fails to provide effective selectivity. Nitrobenzene and furfural exhibit a similar lack of useful selectivity, and sulfur dioxide has been found to be almost completely indifferent to differences in structure of saturated hydrocarbons. Similarly, most of the known selective solvent refining agents are useless, particularly the organic solvents of cyclic nature.

This invention is concerned with the general field above, but based upon a different and little-known phenomenon, namely, the differing ability of hydrocarbons to enter into and to be removed from certain crystalline complexes. As used herein, the term "complex" broadly denotes a combination of two or more compounds.

This invention is predicated upon the discovery that thiourea forms complex crystalline compounds to a varying degree with various forms of aliphatic hydrocarbons and with various forms of cycloparaffinic, cycloolefinic, and highly branched paraffinic and olefinic hydrocarbons.

II. PRIOR ART

For some years it has been known that thiourea forms a complex with ethyl oxalate, and that the complex decomposes in boiling water to its original components, thiourea and ethyl oxalate. This was first described by Nencki, Berichte 7, 780 (1874). Interest in such complexes, was not great, however, for it was not until 1907 that a related observation was made. Kremann (Monatshefte f. Chemie 28, 1125 (1907)) observed that the complexes, designated as "double compounds," of urea and the isomeric cresols are stable at different temperatures. Schotte and Priewe (1,830,859) later separated meta-cresol from the corresponding para isomer by selectively forming a meta-cresol-urea complex, which was described as an "addition compound"; the latter compound was separated from the para isomer and then split up by distillation or with water or acid to obtain pure meta-cresol. The "addition compound" of meta-cresol and urea was shown thereafter to have utility as a disinfectant (Priewe—1,933,757). Bently and Catlow (1,980,901) found a number of aromatic amines containing at least one basic amino group capable of forming "double compounds" with certain isomeric phenols. It has also been shown that trans-oestradiol can be separated from the corresponding cis-compound by forming a "difficultly soluble compound" of urea and *trans*-oestradiol (Priewe—2,300,134). The forces between urea and the compounds of the foregoing complexes are due to specific chemical interaction between the various functional groups.

One heterocyclic compound, 2:6 lutidine, has been found to form a crystalline compound with urea, thus affording a means of separating the lutidine from beta- and gamma-picolines, (Riethof 2,295,606).

Until recently, comparatively few aliphatic hydrocarbon derivatives have been known to form complex compounds with urea. In German patent application B 190,197, IV *d*/12 (Technical Oil Mission, Reel 143; Library of Congress, May 22, 1946), Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "Additions-Produkt" with urea. In the Technical Oil Mission translation of the Bengen application, however, the urea complexes were designated "adducts," which term apparently stems from the anglicized "*add*ition prod*uct*."

It was not until 1947 that interest turned from urea complexes to those of thiourea. Angla (Compt. rendu 224, 402–4 (1947)) described crystalline molecular complexes of thiourea and certain organic compounds, particularly: cyclic hydrocarbons, such as cyclohexane, cyclohexene, polycyclic terpenes; halides, alcohols and ketones of such cyclic hydrocarbons; and halides of short chain paraffins. As stated therein aliphatic and aromatic hydrocarbons do not behave similarly with thiourea. Shortly thereafter, Angla (Compt. rendu 224, 1166 (1947)) described in detail the molecular complex of thiourea and camphor.

III. DEFINITIONS

From the foregoing discussion of the prior art (II), it will be clear that a variety of terms have been applied to thiourea complexes and to urea complexes. What is perhaps the first thiourea complex, ethyl oxalate, was identified broadly by the term "complex." More recently, Angla referred to related compositions as "crystalline molecular complexes." Urea complexes have been rather loosely described as "double compounds," "addition compounds," "difficultly soluble compounds," "Additions-Produkt" and "adducts." All of these terms are somewhat ambiguous in that they have also been used to describe products or complexes of different character than the substances under consideration. This is particularly so with the term "adduct," and the related term "unadducted material." While the term "adduct" is simple and convenient, it is an unfortunate designation, inasmuch as it confuses these complexes with other substances known in the chemical art. Specifically, "adduct" has been applied to Diels-Alder reaction products formed by reaction of conjugated diolefins and olefins and their derivatives. As is well known, Diels-Alder products as a rule do not revert to their original constituents when heated or treated with water, acids, solvents, etc. Moreover, the term "adduct" has been defined earlier as "The product of a reaction between molecules, which occurs in such a way that the original molecules or their residues have their long axes parallel to one another." (Concise Chemical and Technical Dictionary.) Further ambiguity is introduced by the term "adduction," which has been defined as "oxidation." (Hackh.)

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertible associated complex comprising a plexor, such as thiourea, and at least one other compound; said plexad characterized by reverting or decomposing, under the influence of heat and/or various solvents, to its original constituents, namely, a plexor and at least one plexand.

Plexand—a compound capable of forming a plexad with a plexor, such as thiourea; compounds of this character differ in their capacity to form plexads, depending upon various factors described hereinafter;

Antiplex—a compound incapable of forming a plexad with a plexor;

Plexor—a compound capable of forming a plexad with a plexand; such as thiourea.

Plexate—to form a plexad.

Plexation—the act, process or effect of plexating.

IV. OUTLINE OF INVENTION

It has now been discovered that certain branched-chain aliphatic hydrocarbons, plexands, form plexads with thiourea. It has also been discovered that, by selective plexation with thiourea, a more highly branched aliphatic hydrocarbon can be separated, in the form of a plexad, from a mixture containing the same and a less highly branched or straight chain aliphatic hydrocarbon. This separation procedure is effective also when the aliphatic hydrocarbons have the same number of carbon atoms, as in the case of isomers, or have a different number of carbon atoms. Selective plexation is also effective when the aliphatic hydrocarbons are saturated or unsaturated, or a mixture thereof.

It has now been discovered that, by selective plexation with thiourea, cycloparaffins and/or cycloolefins having at least five carbon atoms per molecule and when substituted having only methyl, isopropyl and/or tertiary butyl substituents, can be separated in the form of a plexad from a mixture containing the same in an amount greater than its equilibrium concentration. It has also been discovered that, by selective plexation with thiourea, cycloparaffins and/or cycloolefins can be selectively separated from gasoline fractions boiling within the range of about 100° F. to about 300° F., and particularly from about 100° F. to about 240° F.

In addition, it has been found that the foregoing novel separation can be realized efficiently when conducted at temperatures from about −10° C. to about −30° C., and particularly in successive operations at progressively lower temperatures within this range.

These separation procedures are effective when the cycloparaffinic and/or cycloolefinic hydrocarbons and other hydrocarbons present in the mixtures have the same or different number of carbon atoms. Selective plexation is also effective when the hydrocarbons are saturated thus including cycloparaffins, or unsaturated thereby including cycloolefins.

As contemplated herein, the invention makes possible the separation of one or more plexands from a mixture containing the same, such plexand or plexands being separated in the form of a plexad or plexads which, as described in detail hereinbelow, revert to the plexor, thiourea, and the plexand or plexands under certain conditions. The separation, therefore, is an excellent means for obtaining, in pure or concentrated form, one or more plexands or antiplexes whichever is the desired material. The invention also provides a means of forming new compositions of matter, namely, a number of plexads which may be used as a source of a plexor, thiourea, or as a source of a plexand or an antiplex.

V. OBJECTS

It is an object of this invention, therefore, to provide an effective means for separating hydrocarbons of different molecular configuration from mixtures containing the same.

It is also an object of this invention to selectively separate highly branched aliphatic hydrocarbons from mixtures containing the same.

A further object is to separate a more highly branched aliphatic hydrocarbon from a mixture containing the same and a less highly branched or straight chain isomer.

Still another object is to separate a highly branched aliphatic hydrocarbon from a mixture containing the same and a less highly branched or straight chain aliphatic hydrocarbon having a different number of carbon atoms.

An additional object is to separate a highly branched aliphatic hydrocarbon from a mixture containing the same and another highly branched aliphatic hydrocarbon less susceptible to plexation.

A particular object is the provision of a process for selective separation of highly branched aliphatic hydrocarbons in the molecular weight range of about 68 to about 114 ($C_5$ to $C_8$) from less highly branched or straight chain aliphatic hydrocarbons of similar molecular weight. A more particular object is the provision of a process for selective separation of triptane from mixtures with its isomers.

It is also an object of this invention to selectively separate cycloparaffins from mixtures containing the same. A related object is to selectively separate cycloolefins from mixtures containing the same.

A particular object is to separate cycloparaffins and cycloolefins from hydrocarbon fractions boiling in the gasoline range, particularly from about 100° F. to about 300° F. and from about 100° F. to about 240° F.

Another particular object is to separate cycloparaffins and cycloolefins in the $C_5$ to $C_7$ range from hydrocarbon mixtures containing the same. A more particular object is the provision of a process for selective separation of cyclohexane from hydrocarbon mixtures.

Still another object is the provision of a continuous method of separation of said plexands and antiplexes, which method is flexible, capable of relatively sharp separation, and not highly demanding of attention and of utilities such as heat, refrigeration, pumping power and the like.

An additional object is to provide a plexand or plexands substantially free of an antiplex or antiplexes. A corresponding object is the provision of an antiplex or antiplexes substantially free of said plexand or plexands.

Another object is to provide new and novel plexads comprising a plexand and thiourea. A related object is the provision of new and novel plexad comprising a secondary plexand and thiourea.

Other objects and advantages of the invention will be apparent from the following description.

VI. INVENTION IN DETAIL

As indicated above, it has been found that the foregoing objects are achieved by plexation with thiourea (a plexor) of a plexand or plexands.

(1) PLEXANDS (a) *Saturated and unsaturated aliphatic compounds.*—Plexands contemplated herein are the more highly branched saturated and unsaturated aliphatic hydrocarbons having at least about five carbon atoms per molecule. With the paraffins, it has been found that at least one branched chain is required for plexation of a pentane, at least two branched chains are required for a hexane, at least three branched chains are required for a heptane, at least three branched chains, at least two of which are joined to the same carbon atom, are required for an octane, etc.

This relationship is illustrated by the following tabulation, identified as Table I. Plexation of various saturated paraffins with a 70 per cent aqueous methanol solution saturated with thiourea is indicated as "positive." In those cases where a plexad was not formed, plexation is described as "negative."

*Table I.—Plexation of saturated paraffins with thiourea*

| Paraffin | Carbon Skeleton | Temp., °C. | Plexation |
|---|---|---|---|
| n-Pentane | C—C—C—C—C | 25.0 | Negative. |
| i-Pentane | C—C(—C)—C—C | 25.0 | Positive. |
| n-Hexane | C—C—C—C—C—C | 25.0 | Negative. |
| 2-Methyl Pentane | C—C(—C)—C—C—C | 24.0 | Do. |
| 3-Methyl Pentane | C—C—C(—C)—C—C | 24.0 | Do. |
| 2,2-Dimethyl Butane | C—C(—C)(—C)—C—C | 25.5 | Positive. |
| 2,3-Dimethyl Butane | C—C(—C)—C(—C)—C | 25.5 | Do. |

Table I.—*Plexation of saturated paraffins with thiourea—Continued*

| Paraffin | Carbon Skeleton | Temp. °C. | Plexation |
|---|---|---|---|
| n-Heptane | C—C—C—C—C—C—C | 25.0 | Negative. |
| 2,2-Dimethyl Pentane | (C,C on C2) C—C—C—C—C | 25.5 | Do. |
| 2,3-Dimethyl Pentane | C—C—C—C—C with C,C branches | 24.0 | Do. |
| 2,4-Dimethyl Pentane | C—C—C—C—C with C,C branches | 25.5 | Do. |
| 2,2,3-Trimethyl Butane | C—C—C—C with C,C,C branches | 24.0 | Positive. |
| n-Octane | C—C—C—C—C—C—C—C | 25.0 | Negative. |
| 2,3,4-Trimethyl Pentane | C—C—C—C—C with C,C,C branches | 25.5 | Do. |
| 2,2,3-Trimethyl Pentane | C—C—C—C—C with C,C,C branches | 25.5 | Positive. |
| 2,2,4-Trimethyl Pentane | C—C—C—C—C with C,C,C branches | 25.5 | Do. |

From the results shown in Table I, above it is concluded that the following branched chain saturated paraffins are plexands:

Pentanes: at least one branch—
    iso-pentane
    neo-pentane
Hexanes: at least two branches—
    2,2-dimethyl butane
    2,3-dimethyl butane
Heptanes: at least three branches—2,2,3-trimethyl butane
Octanes: at least three branches of which at least two are joined to the same carbon atom—
    2,2,3-trimethyl pentane
    2,2,4-trimethyl pentane
    2,3,3-trimethyl pentane
    2,2,3,3-tetramethyl butane It is to be understood that these limits apply for plexation at temperatures of the order of about 15–25° C. In general, the minimum degree of branching for a given number of carbon atoms will be lower for plexation at lower temperatures.

Branched chain unsaturated aliphatic hydrocarbons, particularly monoolefins, are also contemplated herein. Monoolefin plexands of this character also contain at least about five carbon atoms per molecule. Here too, it has been found that at least one branched chain is required for plexation of a pentene, at least two branched chains are required for a hexene, at least three branched chains are required for a heptene, at least three branched chains, at least two of which are joined to the same carbon atom, are required for an octene, etc. Because of the geometrical relations of the compounds involved here, it is believed that with the polyolefins and acetylenes, only the highly-branched compounds will form plexads, and a similar relationship between carbon chain length and degree of branching holds with such compounds as well.

Evidence of the foregoing relationship is set forth in Table II, the results shown therein being obtained by contacting various mono-olefins with a 70 per cent aqueous methanol solution saturated with thiourea.

Table II.—*Plexation of olefins with thiourea*

| Olefin | Carbon Skeleton | Temp., °C. | Plexation |
|---|---|---|---|
| 2-methyl-1-butene | C=C(—C)—C—C | 17.0 | Positive. |
| 3-methyl-1-butene | C=C—C(—C)—C | 17.0 | Do. |
| 2-methyl-2-butene | C—C(—C)=C—C | 17.0 | Do. |
| 1-octene | C=C—C—C—C—C—C—C | 25.0 | Negative. |
| 2-ethyl-1-hexene | C=C(—C—C)—C—C—C—C | 24.0 | Do. |
| di isobutylene | (¹) | 25.0 | Positive. |

¹ Mixture of:

2,4,4-trimethyl-1-pentene, 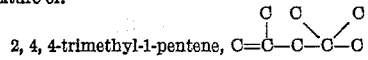

2,4,4-trimethyl-2-pentene, 

It follows from the relationships described above, and from the illustrative results, that the following branched chain mono-olefins are plexands:

Pentenes: at least one branch—
2-methyl-1-butene
3-methyl-1-butene
2-methyl-2-butene Hexenes: at least two branches—
2,3-dimethyl-1-butene
3,3-dimethyl-1-butene
2,3-dimethyl-2-butene Heptenes: at least three branches—2,3,3-trimethyl-1-butene Octenes: at least three branches, at least two of which are joined to the same carbon atom—
2,3,3-trimethyl-1-pentene
2,4,4-trimethyl-2-pentene
3,3,4-trimethyl-1-pentene
3,4,4-trimethyl-1-pentene
2,4,4-trimethyl-2-pentene
3,4,4-trimethyl-2-pentene
3,3-dimethyl-2-ethyl-1-butene di isobutylene It is also to be understood that the foregoing limits apply for plexation of mono-olefins at temperatures of the order of about 15–25° C. For example, 2-methyl-2-butene forms a plexad at 17° C., and not at 25° C.

(b) *Cycloparaffins and cycloolefins.*—Plexands contemplated herein are cycloparaffins and cycloolefins having at least five carbon atoms per molecule and when substituted having only methyl, isopropyl and/or tertiary butyl groups. Typical of such plexands are the following:

Cyclopentane
Methylcyclopentane
Dimethylcyclopentane
Trimethylcyclopentane
Tetramethylcyclopentane
Pentamethylcyclopentane
Cyclohexane
Methylcyclohexane
Dimethylcyclohexanes
Isopropyl cyclohexane
Tertiarybutyl cyclohexane Cyclopentene
Methylcyclopentenes
Polymethylcyclopentenes
Cyclohexene
Methylcyclohexenes
Polymethylcyclohexenes
Isopropyl cyclohexene
Tertiarybutyl cyclohexene Compounds of the foregoing character are present in various hydrocarbon mixtures; particularly in natural, straight run, and thermally and catalytically cracked gasolines. Accordingly, mixtures of this nature are contemplated herein for selective plexation. Straight chain and partially branched paraffins and olefins, as well as aromatics present in such mixtures do not form thiourea plexads. Highly branched paraffins and olefins, however, do form thiourea plexads but the concentration of these compounds in such mixtures is generally negligible in comparison with the total naphthene (cycloparaffin and cycloolefin) concentration; thiourea plexads comprising highly branched paraffins and olefins are described herein.

With regard to the hydrocarbon mixtures containing the desired plexands, it is generally desirable to select mixtures having a relatively high concentration of cycloparaffins and/or cycloolefins. This selection is predicated upon the observation that as the cyclohydrocarbon content decreases, the extraction or separation becomes less efficient. Corerspondingly, separation efficiency decreases as the boiling range of the fraction treated is extended. It has been found, for example, that cyclopentane and cyclohexane hydrocarbons containing n-alkyl substituents such as ethyl, propyl, etc. do not form thiourea plexads. Only a fraction of the naphthenes present in the $C_8$ and greater boiling range material are therefore capable of forming plexads, and they are generally present in such small concentrations that the extraction of this fraction is relatively inefficient. Based upon these considerations, therefore, it is preferred herein to selectively plexate gasoline fractions having a boiling range of about 100° F. to about 240° F., such fractions containing substantial concentrations of cyclohydrocarbons identified above as plexands. Other suitable mixtures are those boiling from about 100° F. to about 300° F., and having a $C_8$ fraction rich in dimethylcyclohexanes; gas oils rich polycyclic substituents; etc.

It has been found that at different temperatures there is a certain minimum concentration for each plexand. This concentration may be termed the "equilibrium concentration," and considered the minimum concentration of plexand required in order for plexation to occur. Similarly, it may be identified as the minimum concentration of a given naphthene in a non-plexating solvent below which no further extraction of the naphthene can be effected by thiourea treatment. "Equilibrium concentration" is also described in detail in related applications Serial Nos. 115,512, now abandoned, and 115,517, filed September 13, 1949.

"Equilibrium concentration" varies for each individual naphthene, but in general, will range at 25° C. from about 6 per cent, by volume, for cyclohexane to about 29 per cent, by volume, for methylcyclohexane. When a mixture of cyclohydrocarbons such os occur in natural or straight run gasoline is treated with thiourea, the cyclohydrocarbons can be removed down to a certain average "equilibrium concentration," which depends to some degree on the composition of the mixture, but is approximately equal to or somewhat lower than the average of the "equilibrium concentrations" of the individual cyclohydrocarbons. The average may be defined as the sum of the equilibrium values for each cyclohydrocarbon multiplied by the volume per cent of each cyclohydrocarbon present expressed as per cent of total cyclohydrocarbons. The "equilibrium concentrations" of the $C_5$-$C_7$ naphthenes in the usual straight run gasoline fraction will fall in the neighborhood of 15 per cent by volume. However, the concentration of the $C_5$-$C_7$ naphthenes in most gasolines is below the latter figure, such that only a small portion of the naphthenes are separated when the gasolines are treated with thiourea. There are, nonetheless, some gasolines rich in naphthenes, such as those derived from California or Gulf Coast crudes, where partial separation of the naphthenes and particularly of the cyclohexane present can be achieved by thiourea treatment at 25° C. The separation even in the particularly favorable cases is relatively incomplete, however, and no more than fifty per cent, and generally less than twenty-five per cent, of the naphthenes present are removed. The separation is improved considerably when only a 100–240° F. fraction of the straight run gasoline is treated. In this instance, a higher degree of separation can be obtained, yet with most of such gasoline fractions the separation is less than fifty per cent efficient. The fractionation of the gasoline can be carried further, of course, and selected narrow fractions obtained with the use of highly efficient fractionating columns from which the naphthenes can be efficiently removed by treatment with thiourea at 25° C.

It has been discovered further, however, that the efficiency with which the cycloparaffins and cycloolefins can be removed from gasoline fractions is increased appreciably by lowering the plexation temperature to below 0° C., and particularly in the range of —10° C. to —30° C. The efficiency of removal of naphthenes on indefinitely long contacting of the gasoline fraction with a slurry of thiourea in a thiourea solvent increases continuously with decreasing temperature. The equilibrium concentration of a particular naphthene in contact with a saturated thiourea solvent decreases, for example by a factor of about 2.0, 2.25 and 2.5, respectively, in successively lowering the temperature from 25° C. to 0° C., from 0° C. to —25° C., and from —25° C. to —50° C. However, when the plexation is carried out at a constant contact time in the range of 0.5 to 2.0 hours, such as advantageous commercially, the naphthenes are not removed to their equilibrium concentrations at the lower temperatures (—30° C. —50° C.) due to a slowing down of the reaction rate. There is observed, therefore, an optimum efficiency for the removal of naphthenes in the range of —10° C. to —30° C. In this range, the final concentration of the naphthenes is reduced by a factor of three to four over that obtained after plexation at 25° C.

Still more complete plexation can be obtained in a given operating time by carrying out the operation with a series of progressively lower temperatures, starting at 25° C. down to as low as —30° C., than can be obtained by carrying out the operation at a single temperature in the range of —10° C. to —30° C.

Equilibrium concentrations for several representative plexands were determined at different temperatures, using a thiourea saturated 70% methanol solution. Normal decane (or n-heptane) hydrocarbon solutions of various concentrations of the cyclohydrocarbon being investigated were stirred with thiourea solution until the minimum concentration at which plexation would take place was defined within ±1.5 per cent by volume. The equilibrium concentration, in a strict sense, should be expressed in terms of mol per cent, in which case it is independent of the nature of the solvent. When the concentration is expressed in volume per cent, however, the variation between hydrocarbon solvents not covering a large molecular weight range is small. The results are summarized in Table III below.

Table III.—Equilibrium values in the thiourea plexation of cyclohydrocarbons

| Solvent | Cyclohydrocarbon | Temp., °C. | Equil. Conc. in Vol. Percent | Equil. Conc. Ratio, 25° C./ 0° C. |
|---|---|---|---|---|
| n-Decane | Cyclopentane | 23 | 19.2±0.7 | |
| n-Heptane | do | 23 | 19.0±1.0 | |
| n-Decane | Methylcyclopentane | 24 | 24.5±1.5 | |
| Do | Cyclohexane | 24 | 6.1±1.3 | |
| Do | do | 0 | 3.05±0.55 | 2.0 |
| Do | Methylcyclohexane | 24 | 28.8±1.4 | |
| Do | do | 0 | 12.0±1.0 | 2.4 |
| | Ethylcyclohexane | 24 | (1) | |

[1] No plexad.

From the data in Table III, it is seen that cyclopentane, cyclohexane and their methylated derivatives form plexads. It is also apparent that the monomethyl substituted cycloparaffins form weaker plexads than the corresponding unsubstituted compounds; also the methylcyclohexane plexad is somewhat weaker than the methylcyclopentane plexad. In addition, it is seen that no plexad is formed when the cyclohexane ring is substituted with an ethyl group.

As a further observation regarding equilibrium concentration, a 50-50 volume per cent mixture of cyclopentane and methylcyclopentane in n-decane, was treated at 23° C. with a thiourea saturated 70 per cent methanol solution, in the manner described above. The equilibrium concentration was found to be 18.3±1.7 per cent, which compares with the average equilibrium value of about 22 per cent. "Equilibrium concentrations" for several representative paraffins and olefins were determined at 25° C., using a thiourea-saturated, 70 per cent methanol-30 per cent water solution. Normal decane-hydrocarbon solutions of various concentrations of the hydrocarbon being investigated were stirred with thiourea solution until the minimum concentration at which plexation would take place was defined within ±2.5 per cent. The results are summarized in Table IV, below.

Table IV.—Equilibrium values in the thiourea plexation of paraffins and olefins

| Hydrocarbon | Temp., °C. | Equilibrium Conc. in Volume Percent |
|---|---|---|
| Isopentane | 25.0 | 62.5±2.5 |
| 2,3-Dimethyl Butane | 25.5 | 29.8±1.2 |
| 2,2-Dimethyl Butane | 25.5 | 10.7±0.8 |
| 2,2,3-Trimethyl Butane | 25.5 | 11.1±0.5 |
| 2,2,3-Trimethyl Pentane | 25.5 | 83.8±1.3 |
| 2,2,4-Trimethyl Pentane | 25.5 | 43.8±1.3 |
| Diisobutylene | 25.0 | 32.5±2.5 |

The completeness with which a particular hydrocarbon may be removed by thiourea plexation may be increased by lowering the temperature. The equilibrium concentration in an antiplex solvent generally decreases by a factor of about two (2) in lowering the temperature from 25° C. to 0° C., and by another factor of about 2.3 in lowering the temperature from 0 to —25° C. This relationship is shown by the following. Equilibrium concentrations for plexad formation of 2,2,3-trimethyl butane and diisobutylene, respectively, were determined at 0° C. for comparison with the values at 25° C. The results are given below in Table V.

Table V

| Hydrocarbon | Equilibrium Conc. (A) in Vol. Percent at 0° C. | Equilibrium Conc. (B) in Vol. Percent at 25° C. | B/A | A/B |
|---|---|---|---|---|
| 2,2,3-Trimethyl Butane | 5.9±1.1 | 11.1±0.5 (25.5° C.) | ≅1.9 | ≅0.53 |
| Diisobutylene | 17.5±0.8 | 32.5±2.5 | ≅1.9 | ≅0.54 |

From the foregoing equilibrium concentration values shown in Tables IV and V, it will be clear that the temperature at which thiourea plexation is carried out most advantageously depends upon the particular hydrocarbons involved and the concentration or purity of the desired hydrocarbon. For example, with a mixture of pentanes obtained by isomerizing n-pentane, temperatures below 0° C., and preferably in the range of −10° C. to −35° C., are recommended for efficient separation of isopentane, in view of the relatively weak thiourea-isopentane plexad. The recovery of primarily 2,3-dimethyl butane from products obtained by isomerization of hexane fractions, is realized most effectively by using low temperatures of the same order, −10° C. to −35° C., inasmuch as unfavorable equilibria in the isomerization process at higher temperatures prevent concentrations of 2,3-dimethyl butane above 10–15 per cent being obtained. However, in the recovery of neohexane from hexane isomates, higher temperatures in the range of 10° C. to −25° C. are advantageous since high concentrations of neohexane can be obtained in the isomates.

(2) ANTIPLEXES

An antiplex, as defined above, is a compound incapable of forming a plexad with a plexor, such as thiourea.

From the foregoing discussion of plexands, it is concluded that the following cycloparaffins and cycloolefins are antiplexes: those containing less than five carbon atoms per molecule; and those having an n-alkyl substitute of two or more carbon atoms. Other antiplexes include aromatic hydrocarbons, and straight chain and partially branched paraffins and olefins.

(3) PLEXOR

The plexor used herein is thiourea, which is in dry condition or, more advantageously, is in solution in a single- or multiple-component solvent. This solution should range from nearly saturated to supersaturated at the temperatures at which it is contacted with a plexand or with a mixture containing one or more plexands and antiplexes, and, in many cases, it will be found convenient to suspend a further supply of thiourea crystals in the solution, handling it as a slurry. For gravity or centrifugal separation, it is convenient to use a solvent of such a specific gravity that after the formation of a desired amount of plexad, the specific gravity of the solvent phase will be different from that of the plexad phase and of the antiplex phase to a degree sufficient to permit separation by gravity, centrifuging, etc. Preferably, in such separations the thiourea solvent should have a density less than that of water.

The solvent should be substantially inert to the plexand and to the compounds of the mixture and also to the thiourea. Preferably, it should also be heat stable, both alone and in contact with thiourea, at temperatures at which the desired plexad is not heat stable.

As indicated above, the solvent may be either single- or multiple-component. It is sometimes convenient, particularly where the plexad is separated by gravity, to ultilize a two-component system, as water and an alcohol, glycol, amine or diamine, or nitrile. Preferably, a lower aliphatic alcohol such as methanol or ethanol, amine such as butylamine or piperidine, or nitrile such as acetonitrile, is used with water. When separating a plexad by filtration procedure, other solvents as well as the foregoing, are advantageous. Such other solvents include aqueous solutions of organic acids such as formic and acetic acids, glycols or glycol ethers such as ethylene glycol and ethylene glycol methyl ether, and amides such as formamide. All of the foregoing solvents, partially saturated to supersaturated with thiourea, are particularly well adapted for a continuous process for separation by plexation.

Solutions containing sufficient water in order to minimize the solubility of the hydrocarbons in the urea solvent, are often employed. The minimum quantity of water required in such instances depends upon the polarity and the molecular weight of the hydrocarbon being treated and, in general, the quantity will be greater with more polar plexands and with lower molecular weight compounds.

In certain cases, the use of single-component solvents is advantageous. Single component solvents other than alcohols can be employed, although they are normally not as useful as the lower aliphatic alcohols. Glycols may be employed as single solvents, yet ethylene glycol is generally not suitable in gravity operations due to the high density of the thiourea-saturated solvent. The higher glycols and particularly the butylene glycols can be advantageously employed. Diamines such as diamino-ethane, -propane and butane can likewise be employed. Additional useful solvents include formic acid, acetic acid, formamide and acetonitrile, although the first three of these are subject to the same limitation as ethylene glycol.

(4) TYPICAL SEPARATIONS

In order that this invention may be more readily understod, typical separations are described below with reference being made to the drawings attached hereto.

The procedure which may be employed in effecting separation of a naphthene or cyclohydrocarbon from a hydrocarbon mixture, may be essentially the same as that described in copending application Serial No. 4,997, filed January 29, 1948. The plexand obtained in decomposing the plexad obtained in a thiourea treatment of a mixture containing compounds of the foregoing character is very pure, provided that only the naphthene form a plexad and provided the plexad be carefully freed of occluded antiplex before it is decomposed. For example, substantially pure cyclohexane is separated from the plexad obtained in the treatment of mixtures containing the same and n-hexane. With a mixture of a naphthene and a highly branched paraffin, each of which forms a plexad with thiourea, a concentrate of the plexand forming the stronger plexad is readily obtained.

In Figure 1, a charge comprising a gasoline fraction boiling from 100° F. to 240° F., is pumped through line 1, by pump 2, to be contacted with a slurry of solid thiourea in a thiourea solvent in line 3. The thiourea solvent is preferably an aqueous alcohol solution, such as aqueous methanol containing from 10 to 30 per cent, by weight, of water. The thiourea solvent may contain a small amount, as from 0.01 to 0.2 per cent by weight of a wetting agent or detergent such as an alkyl sulfate, an alkaryl sulfonate, etc., to improve the settling properties of the plexad and minimize the amount of occluded oil contained therein. Generally, two to five volumes of thiourea solvent per volume of gasoline charged, are employed depending upon the naphthene content of the gasoline.

The gasoline charge and thiourea solution are passed through heat exchanger 4 to reactor, or reactor loop 5, which is preferably maintained at about 20° C. It is generally advantageous to have a contact time of about ¼ hour to two hours in reactor 5. Considerable heat is evolved in the formation of the plexad with solid thiourea, amounting to from 4 to 5 kilo-calories per mol of naphthene plexated. Considerable additional heat is evolved by virtue of the decreasing solubility of the thiourea in the thiourea solvent and consequent exothermic heat of precipitation of solid thiourea on cooling. The refrigeration requirements of the plexation, occurring in reactor 5, can be reduced to a minimum by decomposing the thiourea complex in the presence of an inert solvent, such as a heavy naphtha boiling at 270-400° F., in countercurrent heat exchange relationship. The endothermic heat of decomposition of the thiourea complex and dissolution of the thiourea in the thiourea solvent balances heat evolved by plexation. The inert solvent, entering the system through line 34, is introduced into reactor 5 through line 6 and is removed therefrom through line 7. The inert solvent may have a higher or lower boiling range than the gasoline treated, and the quantity of this solvent is preferably about 10 to 40 per cent greater by volume than the amount of naphthene-free gasoline withdrawn from the system through line 61.

A mixture of naphthene-thiourea plexads, thiourea solvent and unplexated hydrocarbons are taken from reactor 5 through lines 8 and 9 to settler 10, wherein the plexads fall to the bottom by gravity and the unplexated hydrocarbons rise to the top. The unplexated hydrocarbons are withdrawn from the top of settler 10 through line 11 and returned to the system at line 8. Thiourea solvent, saturated with thiourea, is withdrawn from settler 10 through line 12, connecting with line 11. There the amount of excess solid thiourea initially added is such that the thiourea solvent in line 12 is saturated with thiourea. A slurry of thiourea plexads in thiourea solvent is withdrawn from the bottom of settler 10 through line 13 to settler 14. Thiourea solvent rises to the top of settler 14 and is returned to line 9 through line 15. Plexads, free of antiplex hydrocarbons, fall to the bottom of settler 14 and are removed therefrom through valved line 16 to meet solvent in line 17. Plexads may also be removed at periodic intervals from the excess thiourea solvent in the system, through valved line 16, thus preventing the reaction mixture from becoming too thick and slowing down the reaction rate.

Plexads and inert solvent in line 17 are taken through the reactor 5 through lines 6 and 7, the latter joining with line 18. Line 7 is equipped with pump 19 for recycling plexads and solvent through line 6 and reactor 5. The mixture of plexads and inert solvent in line 18 is taken through heat exchanger 4, whereupon the plexads decompose or revert to thiourea and naphthenes. Heat exchanger 20 and heater 21 are also positioned in line 18 in order to effect complete decomposition of the plexads. The material in line 18 enters settler 22, from the bottom of which thiourea is removed through line 23 and returned to line 3. Make up thiourea solution is provided for by line 24, equipped with pump 25 and connecting with line 3.

A mixture of inert solvent (naphtha) and naphthenes is removed from settler 22 through line 26, and is passed through heat exchanger 27 to fractionator 28. Inasmuch as the naphtha is higher boiling than the naphthenes, the latter are taken overhead from fractionator 28 through line 29 and condenser 30 to tank 31. Naphthenes, therefore, are removed from the system through line 32, and can be resolved into individual naphthenes such, for example as cyclopentane, methylcyclopentane, cyclohexane and methylcyclohexane, in another fractionator (not shown). A portion of the naphthenes in tank 31 can be used for recycle in fractionator 28, being introduced through line 33.

Naphtha solvent is removed as bottoms from fractionator 28 through valved line 33 and cooled by heat exchanger 27. Removal from the system of a portion or all of the recovered solvent is provided for by valved line 34; in most operations, however, recovered solvent is recycled through lines 34 and 35. Makeup solvent is provided through line 36, having pump 37 positioned therein.

The unplexated hydrocarbons taken from the top of settler 10 through line 11 to line 8 are then taken through heat exchanger 38 and line 39 to reactor 40. The latter (40) is maintained at about 0° C., in comparison with 20° C. in the initial reactor 5, and further plexation takes place. Refrigeration requirements of reactor 40 are provided by the inert solvent introduced through line 41 and removed through line 42. A mixture of naphthene-thiourea plexads, thiourea solvent and unplexated hydrocarbons are taken from reactor 40 through lines 43 and 44 to settler 45. Plexads fall to the bottom of settler 45 by gravity and the unplexated hydrocarbons rise to the top. Unplexated hydrocarbons are withdrawn from the top of settler 45 through line 46 and returned to the system at line 43. Thiourea solvent, saturated with thiourea, is withdrawn from settler 45 through line 47. A slurry of thiourea plexads in thiourea solvent is withdrawn from the bottom of settler 45 through line 47 to settler 48. Thiourea solvent rises to the top of settler 48 and is returned to line 44 through line 49. Plexads fall to the bottom of settler 48 and are removed therefrom through valved line 50 to meet solvent in line 51. Plexads, again, may be removed at periodic intervals from the excess thiourea solvent in the system, through valved line 50. Plexads and inert solvent in line 51 are taken through the reactor 40 through lines 41 and 42, the latter joining with line 52. Line 41 is equipped with pump 53 for recycling plexads and solvent through line 41 and reactor 40. The mixture of plexads and inert solvent in line 52 is taken through heat exchanger 38 to lines 17 and 6, and is combined with the material in reactor 5.

The unplexated hydrocarbons taken from the top of settler 45 through line 46 to line 43 are taken through heat exchanger 54 and line 55 to reactor 56. The latter (56) is maintained at about —20° C. whereupon additional plexation occurs; reactor 56 is at —20° C., in comparison with 20° C. in reactor 5 and 0° C. in reactor 40. Refrigeration requirements of reactor 56 are met by the inert solvent introduced through line 57 and removed through line 58. A mixture of naphthene-thiourea plexads, thiourea solvent and unplexated hydrocarbons is taken from reactor 56 through line 59 to settler 60. Plexads fall to the bottom of settler 60 by gravity and the unplexated hydrocarbons rise to the top. Unplexated hydrocarbons, comprising naphthene-free gasoline, are withdrawn from the top of settler 60 through line 61 and heat exchanger 62. A slurry of thiourea plexads in thiourea solvent is withdrawn from the bottom of settler 60 through line 63 to settler 64. Thiourea solvent rises to the top of settler 64 and is returned to line 59 through line 65. Plexads fall to the bottom of settler 64 and are removed therefrom through valved line 66 to meet solvent in line 35. Plexads, once again, may be removed from the excess thiourea solvent in the system, through valved line 66. Line 35 has positioned therein, between heat exchanger 62 and reactor 56, cooler 67 to bring the solvent temperature down to that of the material leaving reactor 56.

It will be apparent that each of the reactors 5, 40 and 56 is actually a double reactor loop wherein the thiourea plexads are decomposed in one loop in heat exchange relationship to the plexads being formed in the other loop. The contact time of the inert solvent-thiourea plexad mixture is so adjusted that substantially the same quantity of plexad is decomposed in one loop as is formed in the other. No additional cooling would then be required if there were no heat absorbed through the insulation surrounding the various units. Additional cooling means, cooler 68, is provided in line 69 joining with lines 9 and 1, to remove heat absorbed through the insulation and that developed through friction, etc. Line 69 has pump 70 positioned therein in order to circulate material from line 9. Similarly, cooler 71 is positioned in line 72 joining lines 44 and 39, and line 72 contains pump 73; cooler 74 is positioned in line 75 which joins lines 59 and 55, and line 75 contains pump 76.

It is to be understood that the number of reactor loops employed can be increased beyond those shown in Figure 1. Furthermore, the use of reactor loops can be dispensed with, and the plexation and decomposition can be carried out in a long countercurrent type of heat exchanger. The heat exchanger reactor can be interrupted at intervals where the two mixtures, thiourea solvent-gasoline charge and inert solvent-thiourea plexad, flow into agitators which provide for re-emulsification of the reaction mixtures.

It will also be understood that the process can be carried out with direct cooling of the plexation mixture if desired; that is, the step of carrying out the decomposition of the plexad in heat exchange relationship with the plexation can be omitted. In this case, alternate methods of purification of the slurry from occluded antiplex can be employed typical of which are solvent washing or evaporation of the occluded antiplex in a stream of inert gas such as nitrogen, flue gas, natural gas, etc.

Cooling of the plexation mixture and abstraction of the heat of plexad formation can be effected by direct methods. For example, thiourea solvent following decomposition of the plexad can be distilled in order to obtain a thiourea-free solvent and a slurry of solid thiourea. By mixing the slurry of thiourea, the thiourea-free solvent and the hydrocarbon fraction in the proper proportions, the heat of formation of the plexad can be dissipated by the endothermic heat of solution of thiourea. This procedure is applicable at temperatures above −15° C., for at lower temperatures the solubility of thiourea is relatively unsatisfactory.

Another approach to recovery of the plexands involves removal of the same by distilling the slurried plexad, rather than heating and separating the thiourea slurry and plexads. This is particularly advantageous where emulsions are formed when wetting agents are used in removing antiplex occluded with plexad.

Another feature of the invention involves the use of porous supports impregnated with thiourea. Fixed or moving bed operation can be employed to effect a process of the character described above. For example, diatomaceous earth spheres such as Celite, silica gel, silica-alumina associations in bead form as described in 2,384,946 issued September 18, 1945, to Milton M. Marisic, are suitable porous supports. It has been found that supports having relatively large pore sizes of the order of 50A° to 200A°, particularly about 100A°, are particularly advantageous, as described in application Serial No. 137,739, filed January 10, 1950, now abandoned.

The procedure which may be employed in effecting separation of a more highly branched paraffinic hydrocarbon from a less highly branched or straight chain paraffinic hydrocarbon, may be essentially the same as that described in copending application Serial No. 4,997, filed January 29, 1948. The plexand obtained in decomposing the plexad obtained in a thiourea treatment of a mixture containing compounds of the foregoing character is very pure, provided that only the more highly branched compound forms a plexad and provided the plexad be carefully freed of occluded antiplex before it is decomposed. For example, substantially pure 2,2,3-trimethyl butane is separated from the plexad obtained in the treatment of a mixture containing the same and 2,2-dimethyl pentane. With a mixture of two highly branched paraffins, each of which forms a plexad with thiourea, a concentrate of the plexand forming the stronger plexad is readily obtained. The compound having the greater degree of branching normally will form the stronger plexad; and of two compounds of the same degree of branching, the one having two branch chains on one carbon atom of the chain normally will form the stronger plexad. To obtain a substantially pure plexand from a mixture of two or more plexands, it is necessary to retreat the concentrate with thiourea. A typical mixture to illustrate this feature is one containing 2,2,3-trimethyl pentane and 2,2,4-trimethyl pentane, with the 2,2,4 forming the stronger plexad with thiourea.

In Figure II, a charge comprising a plexand and antiplex, for example, 2,2,3-trimethyl butane and 2,2-dimethyl pentane, respectively, enters through line 101, to be contacted with thiourea solution from line 102, and the charge and solution are intimately mixed in mixer 103. In case the charge undergoing treatment is rather viscous at the temperature of plexad formation, it is advisable to provide a diluent, such as for example, pentene-1, which may be recycled within the process, as described later, and joins the charge from line 104. Diluent make up is provided by line 105.

The temperature employed in mixer 103 will depend upon the hydrocarbons under treatment and the degree of separation to be desired. That is, the completeness with which a given hydrocarbon may be removed by thiourea plexation may be increased by lowering the temperature. As shown above, the equilibrium concentration of an individual hydrocarbon in a non-plexating solvent generally decreases by a factor of two in lowering the temperature from 25° C. to 0° C. and by another factor of about 2.3 in lowering the temperature from 0° C. to −25° C. It will be apparent, then, that conditions of operation vary considerably, conditions selected being those appropriate for the formation of the desired plexad or plexads.

From mixer 103, wherein there is achieved an intimate mixture of thiourea solution and charge, the mixture flows through line 106, heat exchanger 107, and cooler 108 into settler 109. There may be some or a good portion of plexad (2,2,3 - trimethyl - butane - thiourea) formed in mixer 103, but in general, it is preferred to operate mixer 103 at a temperature somewhat above that conducive to heavy formation of plexad. Then, in heat exchanger 107, the temperature of the mixture is reduced, and in cooler 108 adjusted, so that the desired plexad is formed. It will be recognized that this showing is diagrammatic, and that the heat exchangers and coolers, heaters, etc., shown will be of any type suitable, as determined by the physical characteristics of the materials being handled.

From cooler 108, the plexad-containing mixture flows into settler 109. This settler is preferably so managed that there is an upper phase of antiplex (2,2-dimethyl pentane), an intermediate phase of thiourea solution, and a lower region containing a slurry of plexad in the thiourea solution. The incoming mixture is preferably introduced into the solution phase, so that the antiplex (2,2-dimethyl pentane) may move upward and plexad downward, through some little distance in the solution, to permit adequate separation of plexad from antiplex and antiplex from plexad.

Antiplex (2,2-dimethyl pentane) will be removed from settler 109 by line 110 and introduced into fractionator 111, wherein the diluent is removed, to pass overhead by vapor line 112 and eventually to rise through line 114. Recovered antiplex passes from the system through line 113. Obviously if no diluent be used, fractionator 111 will be dispensed with.

Plexad and thiourea solution, withdrawn from settler 109 through line 114 are passed through heat exchanger 107 and heater 115 to enter settler 116 through line 117. In this operation, the temperature is so adjusted that the plexad (2,2,3-trimethyl butane) is freed from the plexad, and in settler 116, the plexad rises to the top to be recovered from the system by means of line 118. The thiourea solution, thus reconstituted to its original condition by return to it of that portion of the thiourea which passed into plexad, is withdrawn from settler 116 by line 102 and returned to process. Naturally, in a process of this kind there are minor mechanical and entrainment losses of thiourea solution, etc., and thiourea solution make up is provided for by line 119.

Figure 2:
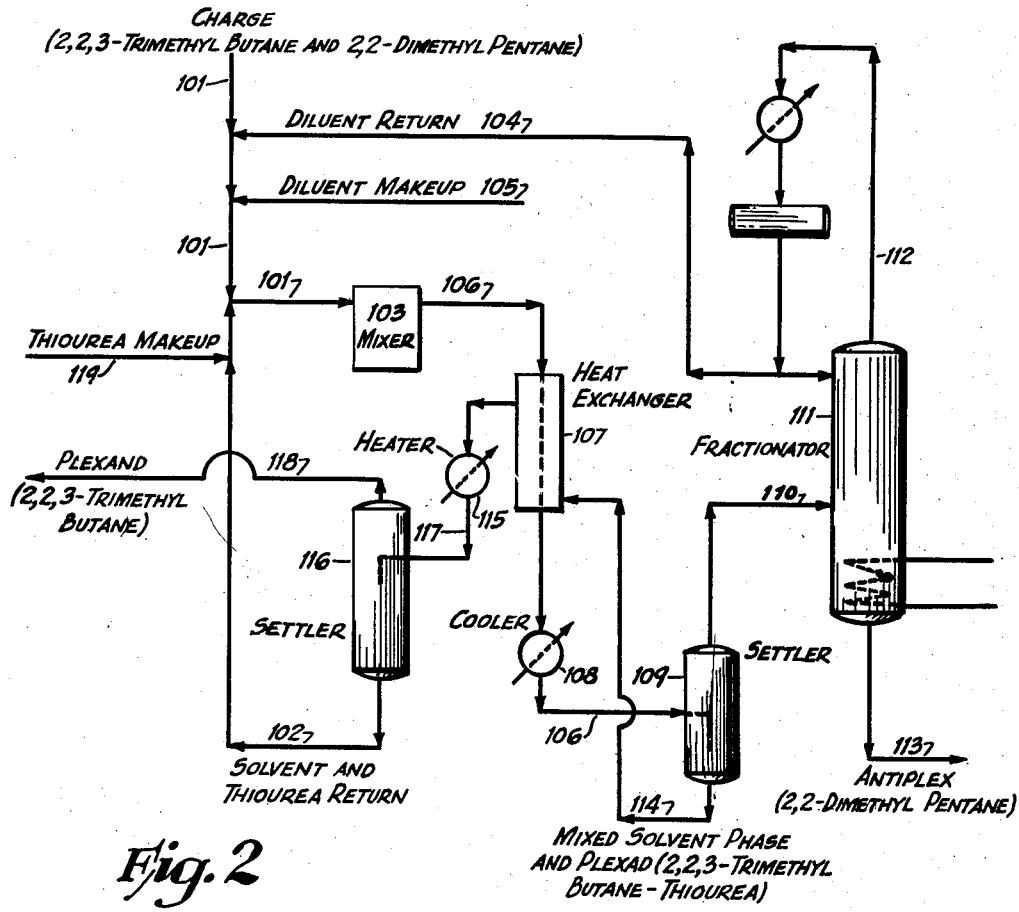
Figure 3:
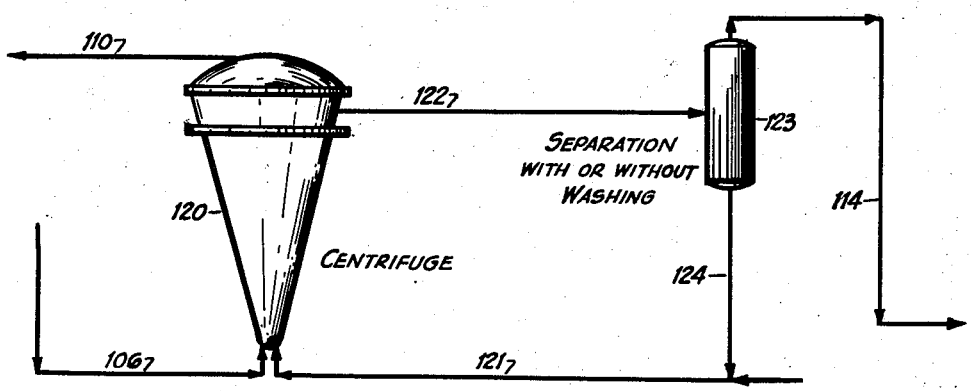

In many cases, the separation of plexad and solution from antiplex may be conducted with greater facility in a centrifuge operation. Such a setup is shown in Figure 3, wherein only the equivalent of that portion of Figure 2 centering about settler 109 is reproduced. Again, in diagram form, the cooled mixture containing antiplex, plexad and thiourea solution enters centrifuge 120 through line 106. In many cases it will be desirable to utilize a carrier liquid in known manner in this operation and that liquid may be introduced by line 121. Antiplex will be carried off through line 110, and plexad, thiourea solution, and carrier, if present, pass through line 122 to a separation step, which may include washing and may be carried out in a settler, a filter, or another centrifugal operation, which separation is indicated diagrammatically at 123. Carrier liquid, if used, returns through line 124, and thiourea solution and plexad pass through line 114. (Note: lines 106, 110 and 114 are the same lines, for the same functions, as in Figure 2 and are identically numbered.)

VII. ILLUSTRATIVE EXAMPLES

The following examples serve to illustrate, and not in any sense limit, the present invention.

(1) *Separation of 2,2,3-trimethyl butane from 2,2-dimethyl pentane*

Forty parts by volume of a mixture of 35 volume per cent of 2,2,3-trimethyl butane and 65 volume per cent of 2,2,-dimethyl pentane, were agitated at about 25° C. with 100 parts by volume of a 70 per cent aqueous methanol solution saturated with thiourea and containing an excess of 22 parts by weight of thiourea. After stirring the resulting mixture for one hour, during which time a plexad was formed, the mixture was filtered. The plexad and unreacted thiourea was removed and washed at 0° C. with 150 parts by volume of pentene-1. After filtering off the pentene-1, the plexad was exposed to the air for one hour to allow evaporation of any remaining pentene-1. The plexad was treated at 25° C. with 100 parts by volume of water to decompose the same, and the hydrocarbon layer formed was removed by distillation. The recovered hydrocarbon, 9.5 parts by volume, was analyzed by the mass spectrograph and found to contain 88.7 volume per cent of 2,2,3-trimethyl butane, as compared with an initial concentration of 35.0 volume per cent. Correspondingly, a considerable concentration of 2,2-dimethyl pentane was realized in the non-plexated portion of the original mixture.

(2) *Separation of 2,2-dimethyl butane from 3-methyl pentane*

A mixture, 40 parts by volume, containing 65 volume per cent of 3-methyl pentane and 35 volume per cent of 2,2-dimethyl butane, was stirred for one hour at 25° C. with 150 parts by volume of a thiourea-saturated 70 per cent methanol solution containing 28 parts by weight of solid thiourea. The plexad thus formed was recovered by filtration and then washed by stirring it with two successive portions, each 200 parts by volume, of a thiourea-saturated 80 per cent methanol solution. The plexad was again filtered and then decomposed by treating the same at 25° C. with 150 parts by volume of water. The hydrocarbon layer obtained by plexad decomposition was removed by distillation. The recovered hydrocarbon, 7.5 parts by volume, was analyzed by the mass spectrograph. Analysis revealed a ratio of 2,2-dimethyl to 3-methyl pentane of 10.3:1, in contrast to a ratio of 0.54:1 for the original mixture. This indicates the following concentrations (per cent by volume):

|  | Original Mixture | Recovered Hydrocarbon |
| --- | --- | --- |
| 2,2-dimethyl butane | 35 | 91.2 |
| 3-methyl pentane | 65 | 8.8 |

Similarly, the recovered antiplex was considerably richer in 3-methyl pentane than the original mixture.

(3) *Separation of naphthenes from natural gasoline*

Thirty parts by volume of a 174–188° F. boiling fraction of natural gasoline were agitated at about 25° C. with 100 parts by volume of a 70 per cent (volume) aqueous methanol solution saturated with thiourea. An excess of 21.7 parts by weight of solid thiourea was added and the resulting mixture was agitated for one hour. The resulting plexads were filtered from the mixture, and were freed of adherent antiplex when dried in an open vessel at 25° C. The plexads were decomposed when contacted with 200 parts by volume of water, and the recovered hydrocarbons were separated from the thiourea and water. The recovered hydrocarbons were then distilled, whereupon 10 parts by volume of hydrocarbons were obtained as distillate. The hydrocarbon distillate contained 98 per cent of cycloparaffins, as revealed by analysis. The composition of the original gasoline and of the distillate are given in the following tabulation:

|  | Gasoline Fraction (Vol. Percent) | Naphthene Plexands (Vol. Percent) |
|---|---|---|
| n-Hexane | | |
| Methylcyclopentane | 15.1 | 25.0 |
| 2,3-Dimethylpentane | | |
| 2-Methylhexane | 40.0 | |
| Cyclohexane | 34.4 | 65.0 |
| Dimethylcyclopentane | 9.7 | 8.0 |
| Benzene | 0.8 | |
| Total | 100.0 | ¹ 98.0 |

¹ Total paraffins 2.0 volume percent.

VIII. UTILITY

From the foregoing description, it will be apparent that the invention has considerable application in the hydrocarbon, petroleum, and chemical arts. For example, in the isomerization of paraffins in the $C_5$ and $C_7$ range at temperatures of about 80-200° F., with catalysts such as aluminum halides or aluminum halide tars promoted with HCl or HBr, the more highly branched isomers present in the products can be recovered by plexation with thiourea. Similarly, in the isomerization of olefins in the $C_6$ to $C_8$ range at temperatures from 200-400° C., with an acidic oxide catalyst such as alumina gels, alumina-silica, alumina-hydrogen fluoride or phosphoric acid on kieselguhr, the more highly branched isomers present in the products can be separated by plexation with thiourea. By way of illustration, 2,3-dimethyl butene can be separated from propylene dimer and the antiplex portion isomerized to produce further quantities of 2,3-dimethyl butene.

Another application of the invention is the separation by thiourea plexation of triptane from less highly branched isomers, formed by the demethylation of "isooctane" at 200° C. in the presence of hydrogen and a nickel catalyst. The demethylation feed can be concentrated by plexation with thiourea to obtain a higher concentration of the desired isomer, namely, 2,2,3-trimethyl pentane.

Triptane, neohexane and other highly branched paraffins formed by thermal alkylation of isobutane with propylene and ethylene, respectively, can be separated from less highly branched isomers by treatment with thiourea as described above.

As a further example, by the cycloparaffins and cycloolefins obtained by plexation are valuable raw materials for the production, by oxidation, of glutaric, adipic and the methyl-substituted dibasic acids. Adipic acid, for example, is used in the formation of nylon. When adipic and methyl adipic acids are sought, the cycloparaffin mixture obtained by plexation of a hydrocarbon mixture, is preferably converted to a mixture consisting predominantly of cyclohexane and methylcyclohexane by isomerization with an aluminum halide catalyst. Similarly, when a cycloolefinic mixture is obtained, cyclohexene and methylcyclohexene can be formed by isomerization of methylated cyclopentenes over an acidic oxide catalyst such as alumina gel, HF-impregnated alumina gel, etc., at 200-350° C. in the vapor phase.

The cycloparaffins and cycloolefins obtained by plexation can be dehydrogenated to aromatic hydrocarbons, predominantly benzene and toluene, and the latter can be blended back with the unplexated gasolines to effect octane improvement.

The process described above is also of value when used in conjunction with the process disclosed in copending application Serial No. 4,997, filed January 29, 1948. In the latter application, there is described a continuous process for separation, with urea, of normal or straight chain hydrocarbons of seven or more carbon atoms from hydrocarbons mixtures containing the same. As contemplated herein, therefore, a suitable hydrocarbon mixture containing straight chain paraffins, branched chain paraffins and still more highly branched chain paraffins can be treated with urea to separate the straight chain paraffins, and the remainder of the mixture can then be treated with thiourea to separate the more highly branched chain compounds; or, a suitable hydrocarbon mixture containing straight chain paraffins, branched chain paraffins and cyclohydrocarbons can be treated with urea to separate the straight chain paraffins, and the remainder of the mixture can then be treated with thiourea to separate the hydrocarbons. Also the mixture can be treated first with thiourea, and the remainder treated with urea. By such procedures, hydrocarbons of different configurations can be obtained in pure or concentrated form.

In addition, the new plexads made available herein constitute desirable sources of thiourea and of the various plexands associated therewith. By way of illustration, monoolefins, such as diisobutylene, and some highly branched paraffins form peroxides upon exposure to air, and as such are less marketable than the unexposed compounds. When such compounds are kept in the form of their corresponding thiourea plexads, however, peroxide formation should occur less readily. In this way, the desired monoolefins can be kept in storage or shipped until just prior to use, when they are separated by reversion of the plexads.

We claim:

1. In the method for fractionating a mixture of hydrocarbons wherein a crystalline complex is formed between a hydrocarbon (I) thereof and thiourea, said mixture also containing a hydrocarbon (II) not forming a crystalline complex with thiourea under the fractionating conditions, and wherein the crystalline complex thus formed of thiourea and hydrocarbon (I) is separated from the remainder of the resulting mixture, said hydrocarbon (I) being selected from the group consisting of: a highly branched chain aliphatic hydrocarbon, a cycloparaffin and a cycloolefin, said cycloparaffin and said cycloolefin having at least five carbon atoms, and methyl-, isopropyl- and tertiary butyl-substituted derivatives of said cycloparaffin and of said cycloolefin, the improvement which comprises: conducting said complex formation at a temperature between about −10° C. and about −30° C.

2. In the method for fractionating a mixture of hydrocarbons wherein a crystalline complex is formed between a highly branched chain aliphatic hydrocarbon (I) thereof and thiourea, said mixture also containing a less highly branched chain aliphatic hydrocarbon (II) not forming a crystalline complex with thiourea under the fractionating conditions; and wherein the crystalline complex thus formed of thiourea and hydrocarbon (I) is separated from the remainder of the resulting mixture, the improvement which comprises: conducting said complex formation at a temperature between about −10° C. and about −30° C.

3. In the method for fractionating a mixture of hydrocarbons wherein a crystalline complex is formed between a highly branched chain aliphatic hydrocarbon (I) thereof and thiourea, said mixture also containing a less highly branched chain aliphatic hydrocarbon (II) not forming a crystalline complex with thiourea under the fractionating conditions, each of said hydrocarbons having at least about five carbon atoms per molecule, and wherein the crystalline complex thus formed of thiourea and hydrocarbon (I) is separated from the remainder of the resulting mixture, the improvement which comprises: conducting said complex formation at a temperature between about −10° C. and about −30° C.

4. In the method for fractionating a mixture of hydrocarbons wherein a crystalline complex is formed between a highly branched chain aliphatic hydrocarbon (I) thereof and thiourea, said mixture also containing a less highly branched chain aliphatic hydrocarbon (II) not forming a crystalline complex with thiourea under fractionating conditions, and wherein the crystalline complex thus formed of thiourea and hydrocarbon (I) is separated from the remainder of the resulting mixture, said hydrocarbon (I) having a molecular weight between about 68 and about 114 and being selected from the group of said aliphatic hydrocarbons consisting of a five carbon atom compound having at least one branch chain, a six carbon atom compound having at least two branch chains, a seven carbon atom compound having at least three branch chains, and an eight carbon atom compound having at least three branch chains at least two of which chains are joined to a common carbon atom, the improvement which comprises: conducting said complex formation at a temperature between about −10° C. and about −30° C.

5. The method of claim 4 wherein said aliphatic hydrocarbon (I) is a saturated paraffin.

6. The method of claim 4 wherein said aliphatic hydrocarbon (I) is a monoolefin.

7. In the method for fractionating a mixture of isomeric aliphatic hydrocarbons of different configuration, having molecular weights between about 68 and about 114, and boiling within a narrow range, wherein a crystalline complex is formed between thiourea and a highly branched chain aliphatic hydrocarbon (I) thereof, a less highly branched chain isomer thereof (II) not forming a crystalline complex with thiourea under the fractionating conditions, and wherein the crystalline complex thus formed of thiourea and hydrocarbon (I) is separated from the remainder of the resulting mixture, said hydrocarbon (I) containing more branching of the carbon chain than said isomer (II) and being selected from the group consisting of a five carbon atom compound having at least one branch chain, a six carbon atom compound having at least two branch chains, a seven carbon atom compound having at least three branch chains, and an eight carbon atom compound having at least three branch chains at least two of which chains are joined to a common carbon atom, the improvement which comprises: conducting said complex formation at a temperature between about −10° C. and about −30° C.

8. In the method for fractionating a mixture of hydrocarbons containing a more highly branched chain aliphatic hydrocarbon (I) and an isomer thereof, wherein a crystalline complex is formed between said hydrocarbon (I) thereof and thiourea, and wherein a crystalline complex is not formed between said isomer thereof and thiourea, and wherein the crystalline complex thus formed of thiourea and hydrocarbon (I) is separated from the remainder of the resulting mixture, said hydrocarbon (I) having a molecular weight between about 68 and about 114 and being selected from the group of said aliphatic hydrocarbons consisting of a five carbon atom compound having at least one branch chain, a six carbon atom compound having at least two branch chains, a seven carbon atom compound having at least three branch chains, and an eight carbon atom compound having at least three branch chains at least two of which chains are joined to a common carbon atom, the improvement which comprises: conducting said complex formation at a temperature between about −10° C. and about −30° C.

9. In the method for fractionating a mixture of hydrocarbons wherein a crystalline complex is formed between triptane thereof and thiourea, said mixture also containing a less highly branched chain paraffinic hydrocarbon having a boiling point similar to that of triptane and not forming a crystalline complex with thiourea under the fractionating conditions, and wherein the crystalline complex thus formed of thiourea and triptane is separated from the remainder of the resulting mixture, the improvement which comprises: conducting said complex formation at a temperature between about −10° C. and about −30° C.

10. In the method for fractionating a mixture of hydrocarbons wherein a crystalline complex is formed between triptane thereof and thiourea, said mixture also containing 2,2-dimethyl butane not forming a crystalline complex with thiourea under the fractionating conditions, and wherein the crystalline complex thus formed of thiourea and triptane is separated from the remainder of the resulting mixture, the improvement which comprises: conducting said complex formation at a temperature between about −10° C. and about −30° C.

11. In the method for fractionating a mixture of hydrocarbons wherein a crystalline complex is formed between 2,2-dimethyl butane thereof and thiourea, said mixture also containing 3-methyl pentane not forming a crystalline complex with thiourea under the fractionating conditions, and wherein the crystalline complex thus formed of thiourea and 2,2-dimethyl butane is separated from the remainder of the resulting mixture, the improvement which comprises: conducting said complex formation at a temperature between about −10° C. and about −30° C.

12. In the method for fractionating a mixture of hydrocarbons wherein a crystalline complex is formed between thiourea and a cyclohydrocarbon (I) selected from the group consisting of a cycloparaffin and a cycloolefin having at least five carbon atoms and methyl-, isopropyl- and tertiary-butyl-substituted derivatives thereof, said mixture also containing a hydrocarbon (II) not forming a crystalline complex with thiourea under the fractionating conditions, and wherein the crystalline complex thus formed of thiourea and cyclohydrocarbon (I) is separated from the remainder of the resulting mixture, the improvement which comprises: conducting said complex formation at a temperature between about −10° C. and about −30° C.

13. In the method for fractionating a mixture of hydrocarbons wherein a crystalline complex is formed between thiourea and a cyclohydrocarbon (I) selected from the group consisting of a cycloparaffin and a cycloolefin and methyl-, isopropyl- and tertiary-butyl-substituted derivatives thereof, said cyclohydrocarbon (I) having a molecular weight of at least 68, said mixture containing said cyclohydrocarbon (I) in an amount greater than its "equilibrium concentration" with thiourea at the fractionating temperature, and said mixture also containing hydrocarbon (II) of like boiling range which does not form a crystalline complex with thiourea under the fractionating conditions, and wherein the crystalline complex thus formed of thiourea and hydrocarbon (I) is separated from the remainder of the resulting mixture, the improvement which comprises: conducting said complex formation at a temperature between about −10° C. and about −30° C.

14. The method of claim 13 wherein the mixture is a gasoline fraction boiling from about 100° F. to about 300° F.

15. The method of claim 13 wherein the mixture is a gasoline fraction boiling from about 100° F. to about 240° F.

16. The method of claim 13 wherein the cyclohydrocarbon is a cycloparaffin.

17. The method for fractionating a mixture of hydrocarbons wherein a crystalline complex is formed between thiourea and a cyclohydrocarbon (I) selected from the group consisting of a cycloparaffin and a cycloolefin and methyl-, isopropyl- and tertiary-butyl-substituted derivatives thereof, said cyclohydrocarbon (I) having a molecular weight of at least 68, from a mixture containing said cyclohydrocarbon (I) in an amount greater than its "equilibrium concentration" with thiourea at the fractionating temperature, and said mixture containing hydrocarbon (II) of like boiling range which does not form a crystalline complex with thiourea under the fractionating conditions, comprising: contacting said mixture with thiourea at an initial temperature of about 20° C., under conditions appropriate for the formation of a crystalline complex of thiourea and said cyclohydrocarbon (I); separating said crystalline complex from the resulting reaction mixture; contacting said resulting reaction mixture with thiourea at about 0° C., under conditions appropriate for the formation of additional crystalline complex of thiourea and said cyclohydrocarbon (I); separating said last-formed crystalline complex from the resulting reaction mixture; contacting the last-mentioned mixture with thiourea at a temperature of about −20° C., under conditions appropriate for the formation of additional crystalline complex of thiourea and said cyclohydrocarbon (I); and separating said last-mentioned, additional crystalline complex from the resulting reaction mixture.

18. The method for fractionating a mixture of hydrocarbons containing a straight chain aliphatic hydrocarbon (A) having at least about seven carbon atoms per molecule, a moderately branched straight chain aliphatic hydrocarbon (B), and a cyclohydrocarbon (C) selected from the group consisting of a cycloparaffin and a cycloolefin and methyl-, isopropyl- and tertiary-butyl-substituted derivatives thereof, said cyclohydrocarbon (C) having a molecular weight of at least 68, wherein said hydrocarbon (A) forms a crystalline complex with urea and wherein said cyclohydrocarbon (C) forms a crystalline complex with thiourea, and wherein said hydrocarbon (B) does not form a crystalline complex with either thiourea or urea under the fractionating conditions, comprising: contacting said mixture with thiourea at a temperature between about −10° C. and about −30° C., under conditions appropriate for the formation of a crystalline complex of thiourea and said cyclohydrocarbon (C); separating said crystalline complex from the thiourea mixture thus formed; separating a hydrocarbon phase containing said hydrocarbons (A) and (B) from said thiourea mixture; contacting said hydrocarbon phase with urea under conditions appropriate for the formation of a crystalline complex of urea and said hydrocarbon (A); separating said last-mentioned crystalline complex from the urea mixture thus formed; and separating said hydrocarbon (B) from said urea mixture.

19. The method for fractionating a mixture of hydrocarbons containing a straight chain aliphatic hydrocarbon (A) having at least about seven carbon atoms per molecule, a moderately branched straight chain aliphatic hydrocarbon (B), and a cyclohydrocarbon (C) selected from the group consisting of a cycloparaffin and a cycloolefin and methyl-, isopropyl- and tertiary-butyl-substituted derivatives thereof, said cyclohydrocarbon (C) having a molecular weight of at least 68, wherein said hydrocarbon (A) forms a crystalline complex with urea and wherein said cyclohydrocarbon (C) forms a crystalline complex with thiourea, and wherein said hydrocarbon (B) does not form a crystalline complex with either thiourea or urea under the fractionating conditions, comprising: contacting said mixture with urea under conditions appropriate for the formation of a crystalline complex comprising urea and said hydrocarbon (A); separating said crystalline complex from the urea mixture thus formed; separating a hydrocarbon phase containing said hydrocarbons (B) and (C) from said urea mixture; contacting said hydrocarbon phase with thiourea at a temperature between about −10° C. and about −30° C. under conditions appropriate for the formation of a crystalline complex of thiourea and said hydrocarbon (C); separating said last-mentioned crystalline complex from the thiourea mixture thus formed; and separating said hydrocarbon (B) from said thiourea mixture.

EVERETT GORIN.
ROBERT E. KINNEY.

References Cited in the file of this patent

UNITED STATES PATENTS

| Number | Name | Date |
|---|---|---|
| 2,499,820 | Fetterly | Mar. 7, 1950 |
| 2,520,715 | Fetterly | Aug. 20, 1950 |
| 2,520,716 | Fetterly | Aug. 20, 1950 |